United States Patent [19]

Corse

[11] 3,956,957

[45] May 18, 1976

[54] DEVICE FOR LONGITUDINALLY SEVERING WEBS

[76] Inventor: Louis Corse, 6, rue Auguste Rodin, Orleans 45018, France

[22] Filed: Oct. 29, 1974

[21] Appl. No.: 519,046

[30] Foreign Application Priority Data

Oct. 30, 1973 France .............................. 73.38672

[52] U.S. Cl. .................................... 83/482; 83/498; 83/499; 83/500; 83/503; 93/58.2 R

[51] Int. Cl.² ...................... B23D 19/04; B26D 1/14

[58] Field of Search ........................ 93/58.1, 58.2 R; 83/331, 332, 343, 344, 500, 502, 503, 504, 477, 498, 499, 482

[56] References Cited

UNITED STATES PATENTS

| | | | |
|---|---|---|---|
| 1,670,317 | 5/1928 | Seymour | 83/332 |
| 2,020,491 | 11/1935 | Winters | 83/482 |
| 2,187,211 | 1/1940 | McKinley et al. | 83/482 |
| 3,272,042 | 9/1966 | Haas | 83/482 X |
| 3,332,326 | 7/1967 | Haas | 93/58.2 |
| 3,545,326 | 12/1970 | Madachy | 83/503 X |
| 3,570,335 | 3/1971 | Marin | 83/482 K |

*Primary Examiner*—Othell M. Simpson
*Assistant Examiner*—W. D. Bray
*Attorney, Agent, or Firm*—Robert E. Burns; Emmanuel J. Lobato; Bruce L. Adams

[57] ABSTRACT

A device for the longitudinal cutting of webs comprises two hollow shafts, each bearing a blade, and supported on a respective spindle. One spindle is supported eccentrically in a frame so that its rotation sets the inter-axis spacing of the two shafts, whereby the blades may be engaged and disengaged in the radial sense. The same spindle is displaceable axially whereby the blades may be engaged and disengaged in the axial sense. Both operations are performed by means of one and the same handle. Means is also provided for displacing simultaneously both spindles in the axial directions in order to position the blades relative to the web.

8 Claims, 3 Drawing Figures

DEVICE FOR LONGITUDINALLY SEVERING WEBS

BACKGROND OF THE INVENTION

The invention relates to a device for cutting a web, of for example paper, longitudinally suitable for use in the printing industry.

The known devices for cutting webs longitudinally generally comprise two spaced apart parallel shafts which in operation rotate in opposite directions, one shaft being provided with one or more circular blades and the other with one or more counter-blades.

The known devices are not altogether satisfactory, because the operation of dismantling the blades and counter-blades makes it necessary for the driving gears for the shafts to be dismantled as a preliminary step, this being a tedious and delicate process.

The object of the present invention is to remedy this drawback, and to provide such a device with means for positioning the blade or blades and associated counter-blade or blades in relation to the web or paper; and positioning the blade or blades in relation to the associated counter-blade or -blades, so that on the one hand they may be moved towards or away from each other in the direction axially of the shafts and on the other hand so that they may be moved towards or away from each other in the radial sense either to take account of wear or re-sharpening.

According to the invention these operations are effected by means of two operating devices one for the axial adjustment of the assembly of the blade or blades and associated counter-blade or blades in relation to the web, and a second device for the adjustment of the offset distance of the blades in both the axial and radial directions in relation to the counter-blade or blades.

Hereinafter, for convenience, reference will be made to the blade and counter-blade in the singular, although it is intended to cover the case of plural items.

SUMMARY OF INVENTION

Accordingly, the invention provides a device for the longitudinal cutting of a web of material comprising a frame, first and second shafts mounted in said frame for rotation about spaced parallel axes, means for driving said shafts in opposite directions, a circular cutting blade mounted on said first shaft for rotation therewith, a circular counter blade mounted on said second shaft for rotation therewith, first means for engaging and disengaging said blades, said first means comprising control means operable to displace one of said shafts axially and radially, and second means for adjusting said blades transversely of a web to be cut, said second means comprising a support, means for locking said shafts in position relative to said support against movement in the axial direction of said shafts, and displacement means interconnecting said frame and support for displacing said support and said shafts relative to said frame in the axial direction.

DESCRIPTION OF PREFERRED EMBODIMENT

Figure 1:
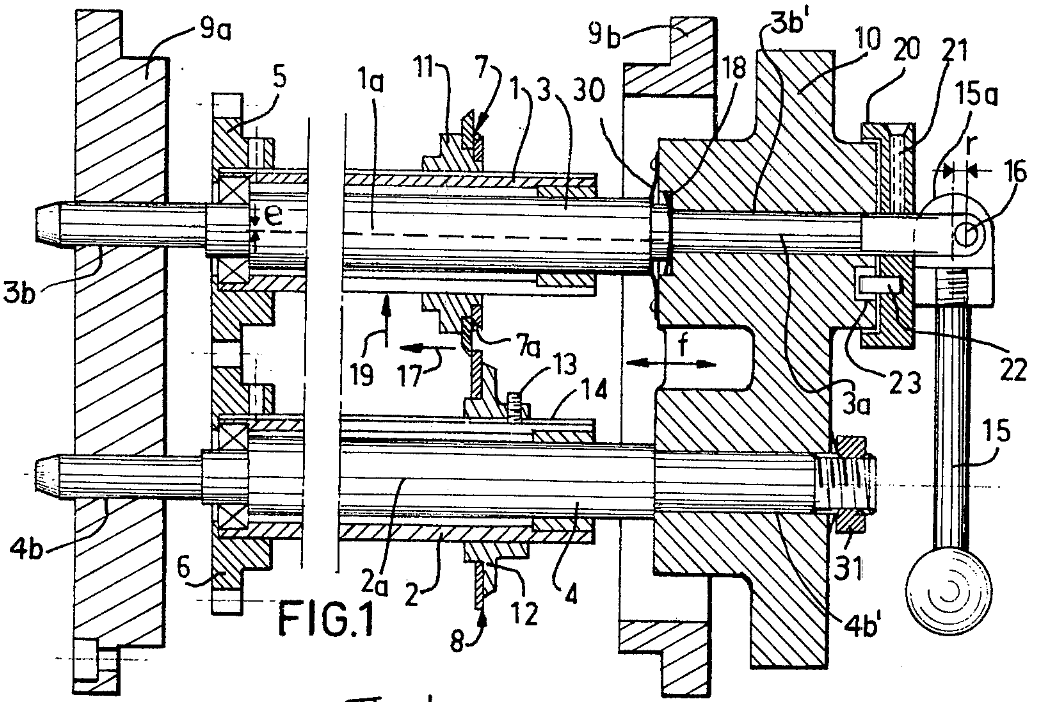
FIG. 1 is a section through a vertical median plane of a cutting device embodying the invention.
Figure 2:
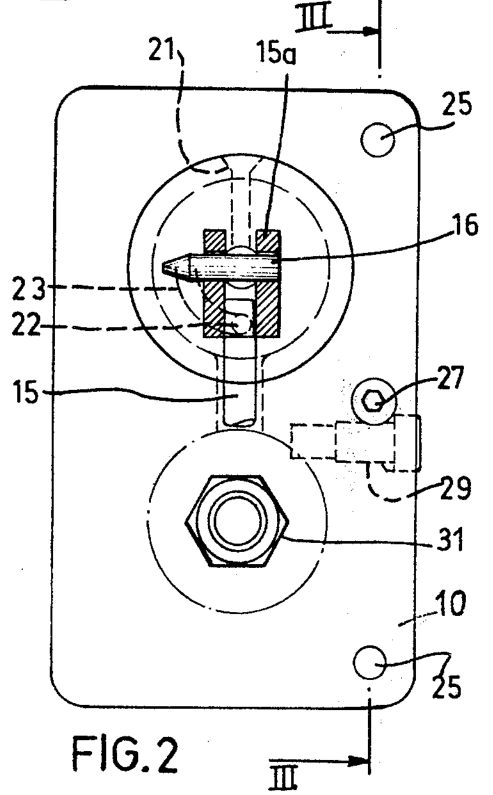
FIG. 2 is a profile view of the device illustrating the control devices.
Figure 3:
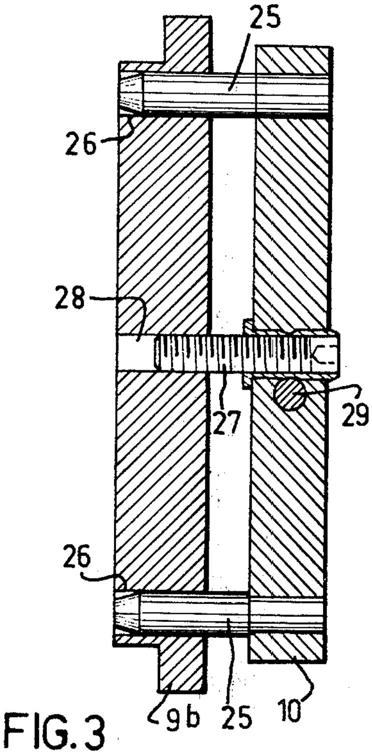
FIG. 3 is a partial section along the line III—III in FIG. 2.

The longitudinal cutting device shown in FIG. 1 comprises an upper hollow shaft 1 and a lower hollow shaft 2, the axes 1*a* and 2*a* respectively of which are parallel and spaced apart.

The shafts are supported for rotation on upper and lower spindles 3 and 4 respectively. Upper and lower pinions 5 and 6 respectively are secured, as by keys, to the shafts and intermesh so that the shafts rotate in opposite directions. One of the pinions meshes with a drive pinion driven by a motor, but not illustrated.

A blade 7 is keyed to the shaft 1 and a counter-blade 8 is keyed to the shaft 2. More than one of each blade may be provided.

The device also comprises a fixed frame consisting of two parallel vertical side plates 9*a* and 9*b* and horizontally movable support 10 mounted on the side plate 9*b* and capable of being displaced in relation to this latter element in the direction shown by the arrow *f*, parallel to the axes 1*a* and 2*a*. The upper and lower spindles 3 and 4 are supported at one end in bores in the movable support 10 and at the other end in bores in the side plate 9*a*.

The blade 7 and counter-blade 8 are supported by discs forming collars 11 and 12 respectively, which are adjustable in the axial direction, on the upper shaft 1 and the lower shaft 2 respectively. Each collar is capable of being fixed at any point by means, for example, of a securing screw 13 engaging a groove 14 in the shaft. With each blade 7 and collar 11 is associated a retaining ring 7a or the like which applies the blade 7 to the collar 11.

The spindle 3 is prevented from rotating in respect of the movable support 10 by means of an elastic washer 30 which is compressed between a collar of the spindle 3 and the support 10, and a handle 15, while the spindle 4 is held in place by means of a locking nut 31 on a threaded portion of the journal 4*b*'. The spindles terminate in journals 3*b*, 4*b* capable of sliding longitudinally with respect to the side plate 9*a* when the movable support 10 is displaced in respect of the side plate 9*b* in the direction shown by the arrow *f*. The lower spindle 4 is prevented from moving longitudinally in respect of the movable support 10 but the upper spindle is capable of being displaced in relation to the support, as will be described in due course.

In accordance with the invention, the device comprises means for causing the upper shaft 1 to slide longitudinally in relation to the lower shaft 2 and also to undergo a radial displacement in relation thereto.

For this purpose a control handle 15 is flexibly mounted, in an eccentric manner, on the end of the upper spindle 3 emerging from the movable support 10, about a horizontal and transversal shaft 16. This handle terminates in a semi-circular ramp or cam surface 15*a*, the centre of which is slightly offset towards the left, and thus towards the side plate 9*b*, by a distance r in relation to the pivot axis 16. By pivoting the handle 15 about the shaft 16 through an angle of 180° in an counter-clockwise direction, therefore, the upper spindle 3 can be moved towards the left and thus in the direction of the side plate 9*a*, because an elastic washer 18, bearing on the movable support 10 and a collar of the spindle 3, biases the spindle in this direction. As the lower spindle 4 is secured against any translatory motion on the support 10, which is fixed, the action of pivoting the handle 15 through an angle of 180° in an anti-clockwise direction causes the upper shaft 1 to slide axially towards the left, through a distance 2*r*, relative to the lower shaft 2, thus enabling the blade 7 to be moved away from its associated counter-blade 8, as shown schematically by the arrow 17 in FIG. 1.

The axis 1*a* of the upper shaft 1 and likewise of the central part of the upper spindle 3 is eccentric in relation to the axis 3*a* of the journals 3*b*, 3*b*1 of the upper spindle 3, which journals respectively engage the bearings formed in the side plate 9*a* and the movable support 10. The eccentricity between the axes 1*a* and 3*a* is indicated by the letter *e* in FIG. 1.

When the upper spindle 3 is displaced towards the side plate 9*a* through a distance 2*a* by pivoting the handle 15*a* through an angle of 180° in an counter-clockwise direction about the shaft 16, causing the blade 7 to undergo a horizontal displacement in relation to the associated counter-blade 8, the washer 30 expands and releases the upper spindle 3, which can then rotate freely about its axis 3*a*. Thus, it is possible to separate the pair of blades 7, 7*a* to inspect and service them without having to loosen the securing screw 13, and the blade 7 may be quickly re-positioned adjacent blade 7*a* at the proper clearance. This rotation, effected by pivoting the handle 15 in a plane perpendicular to that of the drawing, displaces upper shaft 1 radially in relation to the lower shaft 2. When the handle 15 is pivoted in one direction the upper shaft 1 is moved away from the lower shaft 2, in a upward direction, over a distance depending on the angle, through which handle 15 is turned, and equal to 2 *e* at the most, in the direction shown by the arrow 19. The blade 7 is moved away from the associated counter-blade 8 in a vertical direction, which makes it possible, for example, to introduce the web of paper.

On the other hand, when the handle 15 is pivoted in the reverse direction, the upper shaft 1 is moved towards the lower shaft 2, the blade 7 thus being moved towards the counter-blade 8, which then straddle one another over a cutting depth depending on the angle through which the handle 15 has been turned.

With the means for displacing the upper shaft 1 trasversally in relation to the lower shaft 2 is associated a device for regulating the inter-axial distance between the blade and counter-blade. This regulating device comprises a ring 20, which can be secured onto the spindle 3, in any desired position, by means of a securing screw 21. This ring comprises an internal stud 22 directed towards the movable support 10 and entering a circular goove 23 in the movable support 10. This groove is limited to a circular angular sector e.g. a quarter circle, which makes it possible, by setting the angular position of the ring 20 on the spindle 3, to limit the possible angle of rotation of the spindle 3 about the axis 3*a* and thus limit the distance of the radial movement of the blade 7. Needless to say, it is possible to provide a pointer integral with the spindle 3 and moving in front of fixed reference marks on the support 10. Also the internal stud can be borne by the movable support 10 and penetrate a groove in the ring 20.

The device also comprises means for producing a concomitant displacement of the upper shaft 1 and the lower shaft 2 in relation to the side plates 9*a* and 9*b*. This adjustment is obtained by the displacement of the movable support 10 in relation to the side plate 9*b*. The movable support 10 comprises guide pins 25 which engage holes 26 of the side plate 9*b*, in which they can slide. In the example shown in the drawing, two such pins are provided, but it is naturally possible to provide a greater number.

The adjustment device likewise comprises a screw-threaded bar 27 screwed into a tapped hole 28 of the slide plate 9*b*. This threaded bar, which has an external screw head, is rotatably mounted in the movable support 10, in which it can be locked in position by a locking screw 29. This latter screw is released in advance by the operator, who can then rotate the threaded bar 27 when he wishes to displace the movable support 10 relative to the side plate 9*b* and thus to displace simultaneously the blade 7 and counter-blade 8 in relation to the web of paper. The locking screw 29 also enables the support 10 to be moved away from the side plate 9*b*, releasing the pins 25 from the holes 26 without thereby unscrewing threaded bar 27 from the tapped hole 28. The support 10 can thus be displaced in relation to the side plate 9*b* while still keeping the preceding adjustment position separate.

I claim:

1. A device for longitudinally cutting a web of material comprising: a frame, first and second shafts mounted in said frame for rotation about spaced parallel axes, means for driving said shafts in opposite directions, a circular cutting blade mounted on said first shaft for rotation therewith, a circular counter blade mounted on said second shaft for rotation therewith, first means for engaging and disengaging said blades, said first means comprising control means operable to displace one of said shafts axially and radially, and second means for adjusting said blades transversely of a web to be cut, said second means comprising a support, means for locking said shafts in position relative to said support against movement in the axial direction of said shafts, and displacement means interconnecting said frame and support for displacing said support and said shafts relative to said frame in the axial direction.

2. A device as claimed in claim 1, including first and second spindles, said first shaft being hollow and supported for rotation upon said first spindle, said second shaft being hollow and supported for rotation upon said second spindle, and means for limiting axial movement of said shafts relative to said spindles.

3. A device as claimed in claim 2, wherein said frame comprises first and second side members spaced apart in the direction axially of said shafts, said first side member having therein bores for slidably receiving first end portions of said first and second spindles, said support being disposed adjacent said second side member and having bores for receiving second end portions of said first and second spindles, said displacement means extending between said support and second side member.

4. A device as claimed in claim 2, wherein one of said spindles is supported for rotation relative to said frame, the axis of rotation of said spindle being eccentric in relation to the axis of rotation of the shaft on said spindle, and further comprising a handle mounted on said one spindle for effecting rotation thereof.

5. A device as claimed in claim 4, wherein said handle is mounted on said one spindle for rotation with said one sindle about the axis thereof, and for pivotal movement relative to said one spindle about an axis extending radially thereof, and further comprising means cooperative with said handle and one spindle for effecting axial displacement thereof relative to said frame upon pivoting of said handle about said radial axis.

6. A device as claimed in claim 5, including resilient means urging said one spindle in the axial direction in the sense of disengaging said blades, and means preventing rotation of said one spindle when said blades are engaging but permitting such rotation when said blades are disengaged.

7. A device as claimed in claim 4, including means for limiting the permissible degree of rotation of said one spindle, said means for limiting comprising a ring adapted to be secured to said one spindle at a selected angular position, a stud projecting from said ring, and an arcuate groove in said support, said groove receiving said stud.

8. A device as claimed in claim 3, wherein said displacement means comprises bores in said support and second said member, an adjustment screw extending between said bores, one of said bores being screw-threaded and the other receiving a sleeve, rotatable in its bore, and a locking screw engageable with said sleeve to lock said adjustment screw against rotation, and guide means is provided between said support and second side member.

* * * * *